US006260577B1

(12) United States Patent
Keller

(10) Patent No.: US 6,260,577 B1
(45) Date of Patent: Jul. 17, 2001

(54) SYSTEM FOR THE TRANSFER OF REACTIVE RESINS COMPONENTS FROM A REMOTE SOURCE TO THE POINT OF APPLICATION

(76) Inventor: Wilhelm A. Keller, Obstgartenweg 9, CH-6402, Merlischachen (CH)

( * ) Notice: Subject to any disclaimer, the term of this patent is extended or adjusted under 35 U.S.C. 154(b) by 0 days.

(21) Appl. No.: 09/436,631

(22) Filed: Nov. 9, 1999

(30) Foreign Application Priority Data

Nov. 9, 1998 (EP) .................................................. 98811113

(51) Int. Cl.[7] ...................................................... F16D 31/02
(52) U.S. Cl. ........................ 137/565.37; 137/265; 138/31
(58) Field of Search ............................... 137/565.37, 265; 138/31

(56) References Cited

U.S. PATENT DOCUMENTS

| | | | | |
|---|---|---|---|---|
| 3,250,218 | * | 5/1966 | Sinclair | 137/265 |
| 4,214,681 | | 7/1980 | Levine | 222/214 |
| 4,234,007 | * | 11/1980 | Titone et al. | 137/101.19 |
| 5,020,566 | * | 6/1991 | Shoop | 137/265 |
| 5,098,666 | * | 3/1992 | Meinz | 422/111 |
| 5,477,987 | | 12/1995 | Keller | 222/137 |

FOREIGN PATENT DOCUMENTS

| | | |
|---|---|---|
| 668 111 | 8/1995 | (EP) . |
| 787 534 | 8/1997 | (EP) . |
| 2 039 091 | 7/1980 | (GB) . |
| 86/04047 | 7/1986 | (WO) . |
| 96/27448 | 9/1996 | (WO) . |

* cited by examiner

*Primary Examiner*—A. Michael Chambers
(74) *Attorney, Agent, or Firm*—Foley & Lardner

(57) ABSTRACT

The dispensing assembly for transferring at least two liquid components from a remote source to a metering device and for replenishing component accumulators independently of whether the unit is metering or not, comprises a metering device for at least two components with a metering pump and a remote bulk container for each component, whereby for each component the bulk container is connected via a low pressure transfer pump and low pressure transfer hose to a pump inlet adaptor of the metering pump as well as to an accumulator assembly situated immediately before the inlet of the metering pump. This allows the use of low pressure transfer and low pressure metering systems instead of high pressure metering and high pressure transfer systems and hence lower cost dispensing assemblies.

10 Claims, 2 Drawing Sheets

SYSTEM FOR THE TRANSFER OF REACTIVE RESINS COMPONENTS FROM A REMOTE SOURCE TO THE POINT OF APPLICATION

BACKGROUND OF THE INVENTION

The present invention refers to a method for transferring at least one liquid component from a remote source to a metering pump assembly and to a dispensing assembly for carrying out the method, comprising a metering device for at least one liquid component with a metering pump and a remote source for each component.

State of the art metering and mixing machines as commonly used for dispensing two component reactive resins systems such as epoxies, polyurethanes, silicones, acrylics and polysulphides, because of their size in having two chemical reservoirs and a metering system, usually have to be distanced well away from the point of resin mixing and use. It follows, therefore, that the individually metered resins have to be transferred through hoses to that point and because most resin systems are very resistant to flow, they require high pressure for that transfer. Also, because most resin systems are somewhat compressible, it is necessary to use small hose bores so as to minimise their individual content volume compression/decompression and smaller bores demand even higher pressures.

In addition, metering accuracy can be further affected by hose wall flexibility with expansion and contraction according to pressure changes, thus causing compression and decompression of their resin contents during the intermittent starting and stopping of flow. In order to counter all of these disruptive characteristics, sophisticated valves are usually fitted at the hose ends so as to maintain the high pressure within the hoses when metered flow has been stopped. However, this valving brings the additional disadvantages of restriction to the resin flow as well as additional complexity and cost.

SUMMARY OF THE INVENTION

It is therefore a first object of the present invention to avoid the prior art compoundingly detrimental effects upon metering accuracy and the resulting complexity, as well as the required high pressure both for metering and transfer to the point of mixing and/or of application. This object is attained with a dispensing assembly wherein for each component the remote source is connected via a low pressure transfer pump and low pressure transfer hose to the inlet of the metering pump of the metering device as well as to the accumulator assembly situated immediately before the inlet of the metering pump.

With the aforementioned high pressure feeding systems it is necessary to shut off the flow of components after dispensing has taken place, thus involving complex valving devices. It is therefore a second object of the invention to avoid such complex valving devices and to ensure feeding of the dispensing device both while metering is taking place and also while metering has stopped. This object is attained with the method wherein the liquid components are low pressure transferred to the metering pump as well as to an accumulator assembly for each component and whereby the accumulator assembly is replenished independently of whether the metering pump is metering or not.

As described above, the dispensing device of the prior art is connected via a high pressure transfer hose to a remote high pressure metering pump. It is therefore a third object of the invention to provide for the feeding of a point of application metering and dispensing device without the need of high pressure feed. This object is attained with the method wherein the liquid components are transferred by low pressure from a remote source to accumulator storage containers located just prior to the metering pump inlets of the metering device.

Further embodiments and improvements are defined in the dependent claims.

BRIEF DESCRIPTION OF THE DRAWINGS

The invention will be explained in more details hereinafter with reference to the accompanying drawing.

DETAILED DESCRIPTION OF THE INVENTION

Figure 1:
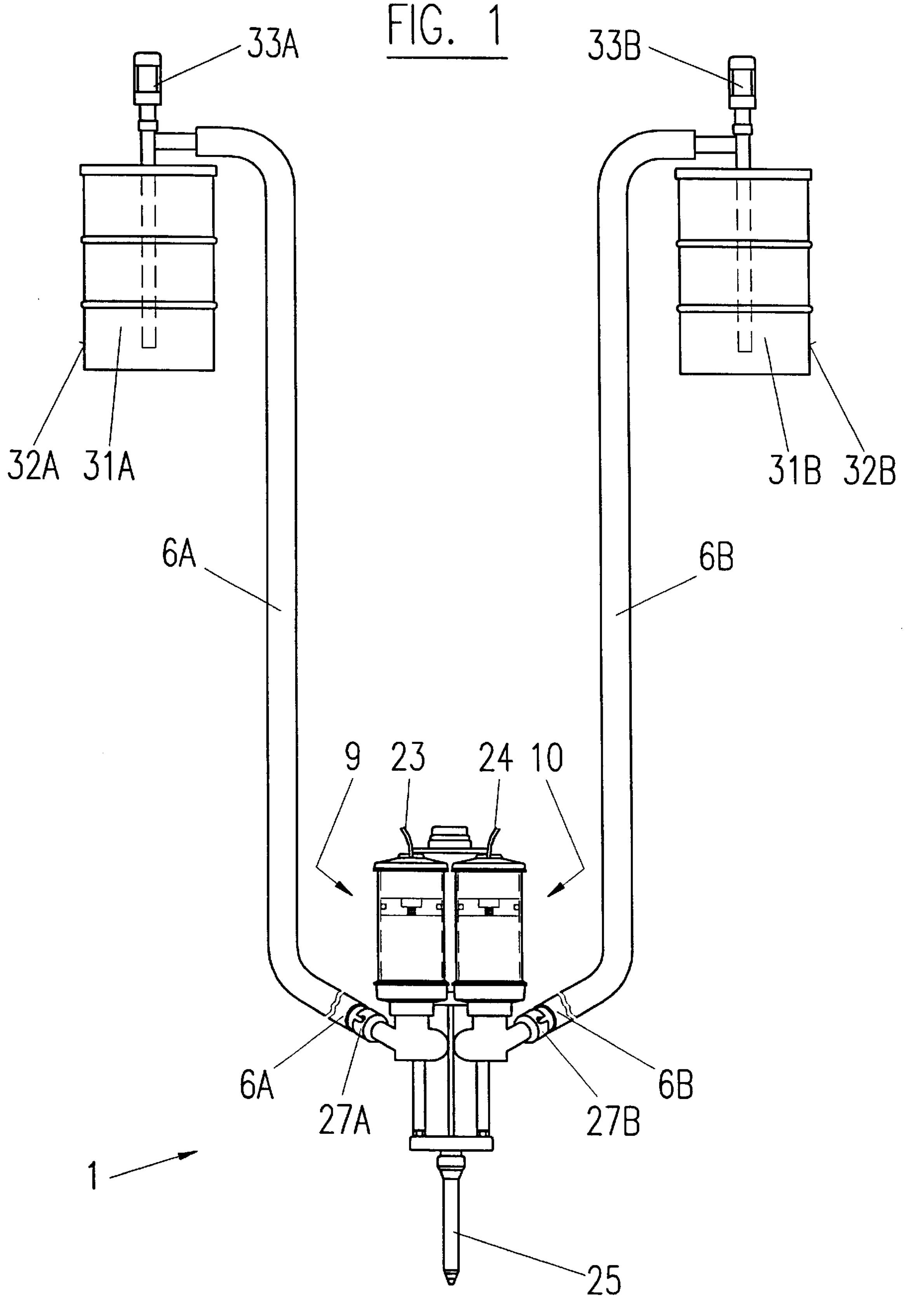
FIG. 1 shows schematically a dispensing assembly according to the invention.

FIG. 1 shows schematically a dispensing assembly of the invention with two remotely located bulk containers 32A, 32B containing the reactive resin components 31A, resp. 31B. The bulk containers are connected via low pressure transfer pumps 33A and 33B and low pressure transfer hoses 6A and 6B to accumulator assemblies 9, 10 and to a metering assembly 1.

Figure 2:
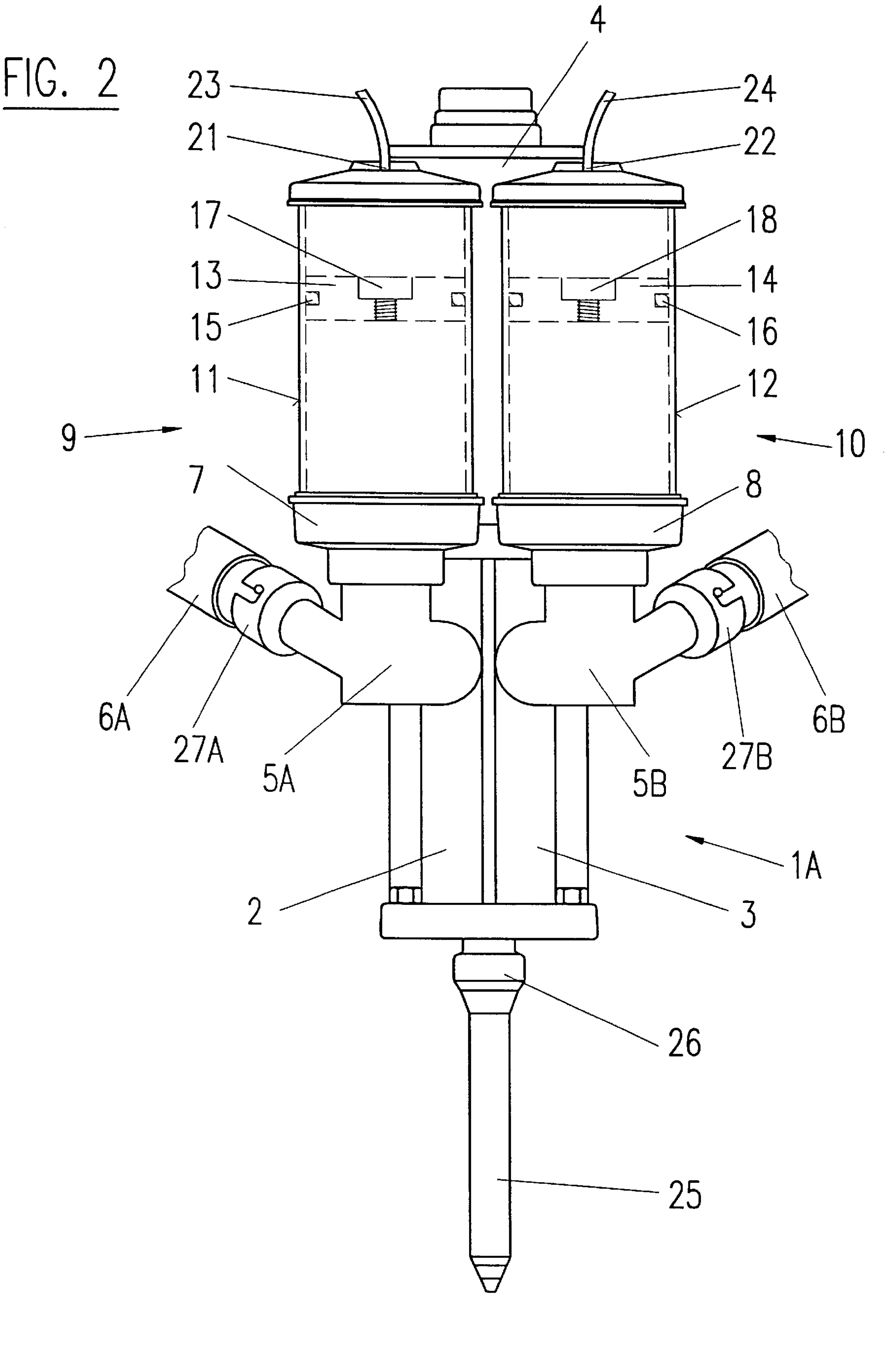
FIG. 2 shows a front view of a two component metering device.

FIG. 2 shows in a detail of FIG. 1 a front view of a two component metering device 1A comprising two metering pumps 2, 3 having a common air cylinder drive unit 4, the low pressure transfer hoses 6A, 6B connected via quick disconnect couplings 27A, 27B to pump inlet adaptors 5A, 5B, which in turn are connected to two accumulator receptacles 7, 8 receiving two accumulator assemblies 9, 10 comprising transparent storage containers 11, 12 and within those storage containers pistons 13, 14 with seals 15, 16, and air bleed plugs 17, 18 for priming. At the front of the metering pumps 2, 3 a static or dynamic mixing device 25 is directly connected by a mixer attachment nut 26.

The pump inlet adaptor has the function of a T-piece so that the component is able to flow into the inlet opening of the metering pump as well as into the container of the accumulator assembly. Therefore, the component flowing through the relatively large diameter hose 6A, 6B under low pressure of, for ex. 2–3 bars, flows directly into the metering pump. During the time the pump is not dispensing, the component flows into the accumulator. The flow of the component can continue even while dispensing is taking place, the component flowing either into the pump, if needed, or into the accumulator assembly. If the flow through the low pressure transfer hose 6A, 6B is not enough for dispensing, the component is drawn from the accumulator assembly. It is evident that the dimensions of the accumulator assembly and the flow in the low pressure transfer hose must be in a relationship to the output of the metering pump in order to ensure that the component can be dispensed without interruption within a working cycle of the equipment.

The top of the storage container 11, 12 has a removable sealing cap 19, 20 with air pressure inlet adapter 21, 22 with hose 23, 24 for the supply of pressurized air.

In the case of long intervals between dispensing, the accumulator assembly will be filled, that is the pistons will move to the top of the storage container. The air pressure inside the accumulator assembly is activated only during the reloading stroke of the metering pump and is generally lower than the pressure in the transfer hoses so that there need not be a high air pressure for assisting the piston to overcome the piston seal friction in the case of permanently connected resin component transfer or to assist in reloading the metering pump when the transfer hose is disconnected.

It follows that the invention proposes a simple and problem free alternative to the prior art whereby the two, non-metered, resin components are transferred by low pressure through large bore hoses from bulk containers to two accumulators situated just prior to the inlets of the metering pumps, the required pressure of the metering pumps being adequate only to overcome the resistance of the mixing device. In turn, the metering pumps are situated just prior to the point of mixing and/or application, e.g., as described for a point of application metering, mixing and dispensing device disclosed in EP-A-0 787 534 or U.S. Pat. No. 5,477,987. The invention allows the use of low pressure transfer with low pressure metering systems instead of high pressure metering with high pressure transfer systems and thus the use of lower cost equipment.

In addition, it follows that with the aforementioned two accumulator assemblies which are situated just prior to the point of metering, mixing and application the low pressure non-metered transfer feed is active not only while dispensing is taking place, as compared with high pressure transfer, but also between dispensing.

As a third aspect of the invention based upon the arrangement as described above, the individual components are drawn by vacuum beneath pressure differential movable pistons which are sealed within and against the inner wall of the accumulators situated at the pump inlets, the vacuum being generated by each relative positive displacement metering pump reload stroke.

And finally according to viscosities, a fourth aspect of the invention is, in the case of continuous low pressure transfer, the provision of adjustable air pressure assistance above each of the pistons within the accumulators to overcome piston seal friction, whereas in the case of disconnected transfer hoses allowing the pressure above the movable piston to be increased, and thus speeding the reloading of the metering pumps.

It follows further from the description that the dispensing device can be used as a hand held dispensing device, wherein the storage containers 11, 12 are loaded and replenished. For the filling up of the storage containers, the low pressure transfer hoses 6A, 6B are connected via the quick connect couplings 27A, 27B to the pump inlet adaptors 5A, 5B. After disconnection of the low pressure transfer hoses, the openings of the adaptors are closed and sealed by check valves. Thus, the metering device can be used as a hand held dispensing device.

It follows from all the aspects of the invention that the feeding of the metering device can be effectuated by low pressure transfer and thus under ideal technical conditions.

What is claimed is:

1. A method for transferring at least one liquid component from a remote source to a metering pump assembly, whereby the liquid components are low pressure transferred to the metering pump as well as to an accumulator assembly for each component and whereby the accumulator assembly is replenished independently of whether the metering pump is metering or not.

2. A dispensing assembly for carrying out the method of claim 1, comprising a metering device for at least one liquid component with a metering pump and a remote source for each component, wherein for each component the remote source is connected via a low pressure transfer pump and low pressure transfer hose to the inlet of the metering pump of the metering device as well as to the accumulator assembly situated immediately before the inlet of the metering pump.

3. A dispensing assembly according to claim 2, wherein the connection between the low pressure hose and the inlet of the metering pump and the accumulator assembly is a T-shaped pump inlet adaptor with one outlet leg being connected to the inlet of the metering pump and the other outlet leg being connected to the accumulator assembly.

4. A dispensing assembly according to claim 2, wherein the accumulator assembly has an internal sealed piston with a removable and replaceable air bleed plug.

5. A dispensing assembly according to claim 4, wherein the sealed piston of the accumulator assembly is an internal pressure differential movable piston.

6. A dispensing assembly according to claim 2, wherein the accumulator assembly is provided with an adjustable air pressure assistance above the piston.

7. A dispensing assembly according to claim 2, wherein the connection between the low pressure transfer hose and the pump inlet adaptor comprises a quick disconnect coupling.

8. A dispensing assembly according to claim 2, wherein the metering device comprises a dynamic or static mixing device.

9. A method for replenishing storage containers connected to a metering device, wherein the liquid components are transferred by low pressure from a remote source to accumulator storage containers located just prior to the metering pump inlets of the metering device.

10. A dispensing device for carrying out the method of claim 9, wherein the pump inlets are provided with pump inlet adaptors connected to the accumulator storage containers and to the low pressure transfer hoses, whereby the pump inlet adaptors comprise quick disconnect couplings having check valves on both mating coupling parts, the dispensing device being, after disconnection of the low pressure transfer hoses, a hand held dispensing device.

* * * * *